(12) United States Patent
Hariguchi et al.

(10) Patent No.: US 6,665,297 B1
(45) Date of Patent: Dec. 16, 2003

(54) NETWORK ROUTING TABLE

(75) Inventors: Yoichi Hariguchi, Menlo Park, CA (US); Jayant K. Talajia, San Jose, CA (US); G. Paul Ziemba, Redwood City, CA (US)

(73) Assignee: Mayan Networks Corporation, Sunnyvale, CA (US)

( * ) Notice: Subject to any disclaimer, the term of this patent is extended or adjusted under 35 U.S.C. 154(b) by 0 days.

(21) Appl. No.: 09/458,535

(22) Filed: Dec. 9, 1999

(51) Int. Cl.[7] .......................... H04L 12/28; H04L 12/56
(52) U.S. Cl. .................... 370/392; 370/395.32
(58) Field of Search .................. 370/389, 392, 370/400, 401, 395.32, 395.71, 395.72, 395.7, 395.31

(56) References Cited

U.S. PATENT DOCUMENTS

| | | | |
|---|---|---|---|
| 5,386,413 A | | 1/1995 | McAuley et al. |
| 5,390,173 A | * | 2/1995 | Spinney et al. ............. 370/393 |
| 5,414,704 A | * | 5/1995 | Spinney ...................... 370/389 |
| 5,490,258 A | | 2/1996 | Fenner |
| 5,521,910 A | | 5/1996 | Matthews |
| 5,841,874 A | | 11/1998 | Kempke et al. |
| 5,842,224 A | * | 11/1998 | Fenner ........................ 711/202 |
| 5,852,607 A | * | 12/1998 | Chin .......................... 370/401 |
| 6,018,526 A | * | 1/2000 | Liu et al. ..................... 370/401 |
| 6,181,698 B1 | * | 1/2001 | Hariguchi ................... 370/392 |
| 6,307,855 B1 | * | 10/2001 | Hariguchi ................... 370/392 |
| 6,374,326 B1 | * | 4/2002 | Kansal et al. ............... 711/108 |

OTHER PUBLICATIONS

Hariguchi, U.S. patent application Ser. No. 08/890,350, Network Routing Table Using Content Addressable Memory.
McAuley et al., "Fast Routing Table Lookup Using CAMs", 1993 IEEE Journal of Solid–State Circuits, pp. 1382–1391.
NetLogic Microsystems, "CIDR Processor–NL77542", http://www.netlogicmicro.com/products/cidr.html, © 1998 NetLogic Microsystems, Inc.
NetLogic Microsystems, "High–Speed Address Search Engine $\mu$PD98421", http://www.ic.nec.co.jp/english/products/partic/9806–01.html, ©NEC Corporation 1994–1999.
NetLogic Microsystems, "IPCAM–2 Module", http://www.netlogicmicro.com/products/nm18x721.html, © 1998 NetLogic Microsystems, Inc.
NetLogic Microsystems, "Ternary Synchronous Content Addressable Memory (IPCAM™)", http://www.netlogicmicro.com/products/NL82721.html, © 1998 NetLogic Microsystems, Inc.
Just imagine NEC Multimedia, "$\mu$PD87421", ©NEC Corporation 1998, Date Published Feb. 1999.

* cited by examiner

Primary Examiner—Wellington Chin
Assistant Examiner—Chirag Shah
(74) Attorney, Agent, or Firm—Gary S. Williams; Pennie & Edmonds LLP (57) ABSTRACT

A deterministic routing table includes a set of hash circuits and a CAM. The routing table searches for the longest matching destination address stored in any of the hash circuits and the CAM, if any, and outputs an output pointer associated with that destination address within a fixed predetermined time.

27 Claims, 7 Drawing Sheets

Block Diagram of a Content Addressable Memory

Timing Diagram of Search Command

FIG. 6

Flowchart of a Search

FIG. 7

NETWORK ROUTING TABLE

The present invention relates generally to routing packets in a network such as the Internet, and particularly to a network routing table that ensures that a destination address of a packet is mapped to a route in a fixed amount of time.

BACKGROUND OF THE INVENTION

In packet networks, information is transferred through the network from a source computer to a destination computer using packets called datagrams. The datagrams include data from the source and a destination address. The datagrams are routed through the network based on the destination address. The source and destination computers are called hosts. The network is an interconnection of hosts and routers. Typically routers have many network interfaces or ports connecting to other routers and hosts. The routers have input ports for receiving incoming datagrams and output ports for transmitting outgoing datagrams. The routers route the datagrams to a host or to another router based on the destination address. The routers store information about routes in a routing table.

In the Internet protocol (IP), a route is either an indirect route or a direct route. When a route is an indirect route, the next destination is another router. A routing table entry indicates the next router's IP address and related information, such as the network interface connecting to the next router. When a route is a direct route, the next destination is the destination host. In this case, the routing table entry indicates the network interface to which the destination host is connected.

A hop is a direct interconnection between two routers, two hosts, or a router and a host. An indirect route has more than one hop to a host, while a direct route has one hop to the host. A next hop is the router or host at the distant end of the hop. A next hop's IP address is the IP address of the router or host at the distant end of the hop.

The information in a route entry in a routing table includes at least the following: a destination IP address, a prefix length, a next hop's IP address and address port information. The IP address has thirty-two bits. The prefix length specifies the number of leading bits of the IP address defining a network portion of the address. The remaining bits define a host portion of the address. The network portion of the address is often referred to as the IP network address. The entire IP address is usually referred to as the IP host address. For example, using standard Internet dotted decimal notation, 172.16.10.20/24 would indicate an IP prefix length of 24 bits, a network address of 172.16.10.0, and an IP host address of 172.16.10.20.

IP routing is based on either the IP network address or the IP host address. Routes specified with IP network addresses are called network routes. Routes specified with IP host addresses are called host routes. IP routers handle both network and host routes.

When a router receives a datagram with a destination address for a host that is not connected to that router, the router routes the datagram to another router. Each router has a routing table defining routes or ports to use to route the datagram. The routing table stores routing table entries. Each routing table entry includes at least a destination IP address, the prefix length of that destination IP address, the next hop's IP address for that destination, and the network interface (port) to be used for sending a datagram to the next router or host. When a routing table entry is a direct route to a host, the next hop's IP address is typically stored as 0.0.0.0. When the route is a host route, the prefix length is set equal to thirty-two.

When searching for a route in the routing table, the router uses the destination IP address of each datagram as the search key. Although all datagrams include a destination IP host address, no datagrams include the prefix length information. Therefore, routers need to determine which portion of the IP host address includes the IP network address for network routes.

To determine a route, one prior art routing table architecture uses a hash table. In hash-based routing tables, two tables and one special route entry are typically used. The first table, rt_host, is used for host routes and stores IP host addresses and output ports. The second table, rt_net, is used for network routes and stores IP network addresses and their route information. The special route entry specifies a default route. When a datagram is being routed, the router searches the first table, rt_host, for host routes, if any. The router performs the search by comparing the destination address to the IP host addresses in the routing table. When no IP host address in the first table matches the destination address, the first table does not specify the host route and the search fails. When the search of the first table fails to find a host route, the router searches the second table, rt_net, to determine a network route, if any, using the destination address and the IP network addresses stored in the second table. When no IP network address in the second table matches the destination address, the second table does not specify the network route and the search fails. When the search of the second table fails to find a network route, the router uses the default route, if specified.

The first and second tables, rt_host and rt_net, respectively, are usually implemented as hash tables. For the first table, rt_host, routers use the entire destination IP host address in the incoming datagram as a hash key to determine a starting pointer to a linked list in the first table. A linear search is performed through the linked list to determine whether the destination IP host address matches any entry in the linked list. If so, this matching entry, which has the host route, is returned.

For the second table, rt_net, routers use a set of leading bits of the destination IP host address in the incoming datagram as a hash key to determine a starting pointer to a linked list in the second table. The set of leading bits of the destination IP host address is the destination IP network address. Routers determine the prefix length from the traditional IP address class information. The router uses the prefix length to determine the number of leading bits of the destination IP network address to apply as the hash table key. A linear search is then performed through the linked list to determine whether the destination IP network address matches any entry in the linked list. If so, this matching entry, which contains the network route, is returned.

In the second table, rt_net, the linked list is pre-sorted by IP prefix length in descending order. When the second table, rt_net, is searched, the first match will select the longest match of the network portion of the destination address.

The hash-based routing methods are slow because a linear search is performed through the linked list in the hash table. The amount of time to search for a route is a function of the number of entries in the linked list. Therefore, route lookup cannot be done in a predetermined, fixed amount of time. In other words, searches have no fixed upper bound on the amount of time to perform the search.

In a second prior art routing table architecture, a radix or Patricia tree routing table is used. In radix tree routing, the radix tree routing table traverses a binary tree of network and host IP addresses to find a match to the destination address. A radix tree search can minimize the number of bits to be tested to distinguish among a set of bit strings. However, a radix tree search cannot search for a route in deterministic time. Since radix tree routing allows back tracking, radix tree searching can also be slow.

A third routing table architecture is shown in U.S. Pat. No. 5,386,413. In the '413 patent, all possible values to be compared with the incoming address are split into multiple content addressable memory (CAM) banks. Each CAM bank uses a single mask in conjunction with the incoming address to select at most one associated output value in the bank. For IP routing, twenty-four separate CAM banks would be needed. If more than one bank selects an output value, the value used is determined by a predetermined static priority of the CAM banks. The '413 patent achieves IP routing in a fixed, deterministic amount of time, but requires extensive use of CAMs. Since CAMs are expensive, this architecture is expensive.

Therefore, an apparatus and method is needed for a network routing table that performs a search for any specified destination address in a fixed, deterministic amount of time. This apparatus and method should also reduce implementation cost.

SUMMARY OF THE INVENTION

A deterministic routing table includes a set of hash circuits and a CAM. The routing table receives a destination address, searches for the longest matching address stored in any of the hash circuits and the CAM, if any, and outputs an output pointer associated with that destination address, if any, within a fixed predetermined time.

More particularly, a router has input ports for receiving a message having a message destination address. The router also has output ports for outputting the message. The router has a routing table circuit including a content addressable memory (CAM), hash circuits and a selection circuit. The CAM stores data pairs. Each data pair includes an address value and a prefix length. The CAM outputs an output pointer associated with the address value when a portion of the message destination address matches a corresponding portion of the address value specified by the prefix length stored in the data pairs. The hash circuits are connected in parallel with the CAM. Each hash circuit is connected in parallel with other hash circuits. Each hash circuit hashes a portion of the message destination address to provide a hashed-message-destination address. Each hash circuit has a hash bucket storing output pointers at associated hash bucket addresses in the hash bucket. Each hash circuit outputs an output pointer, if any, associated with the hashed-message-destination address. A selection circuit is connected in series with the CAM and the hash circuits. The selection circuit selects one of the output pointers output by the hash circuits and the CAM.

In this way, the routing table performs a search in a fixed amount of time. In addition, by using a single CAM, the implementation cost is reduced.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
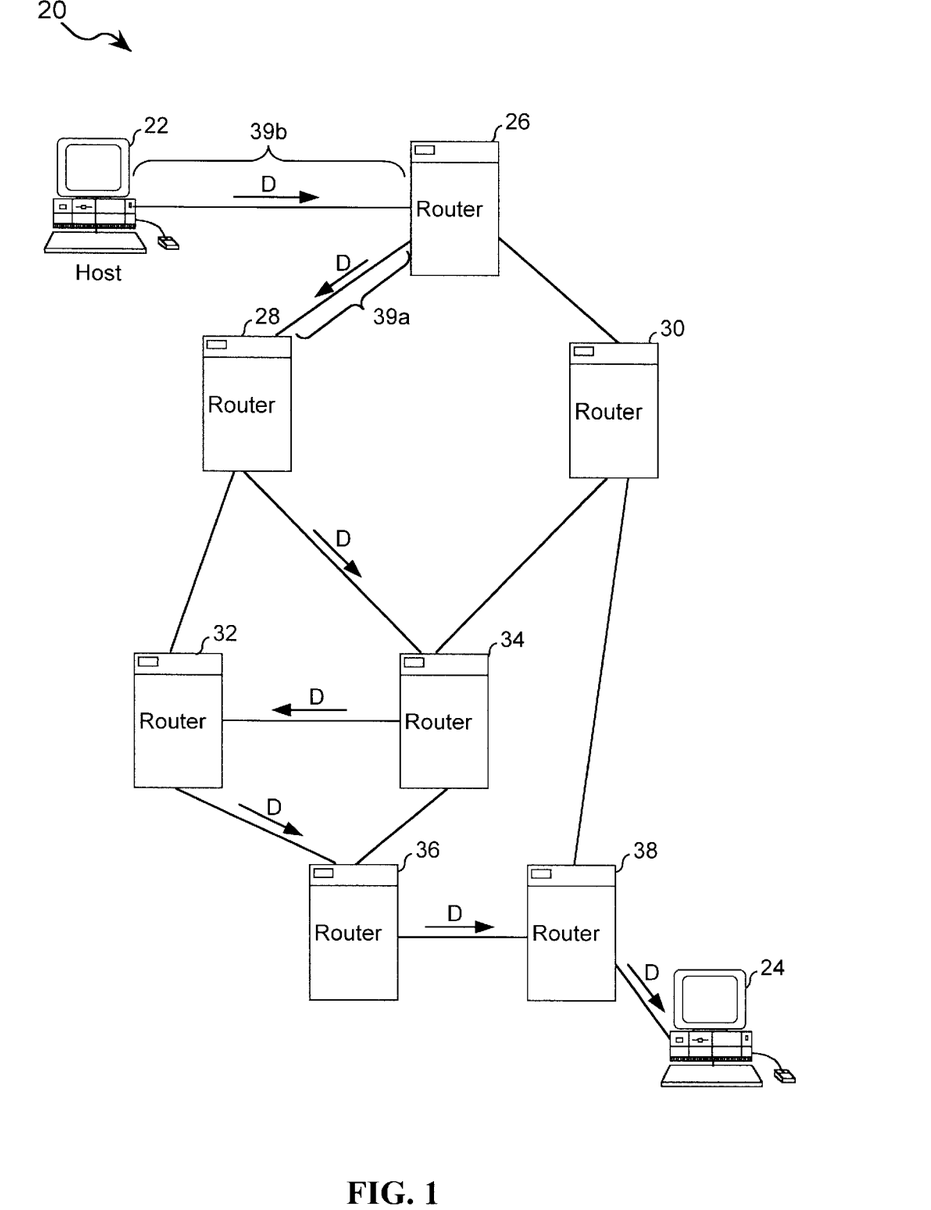
FIG. 1 is a diagram of an exemplary network of hosts and routers using the routing table of the present invention.

In FIG. 1, in an exemplary packet network 20, a source host computer 22 sends information to a destination host computer 24. The source host computer 22 places the information in one or more datagrams D and sends that information to the destination host computer 24 via a network of routers 26–38. An exemplary hop 39a interconnects two routers. The arrows show the path of the datagram D through the network of routers 26–38 to the destination host computer 24. The routers 26–38 use the routing table of the present invention.

Figure 2A:
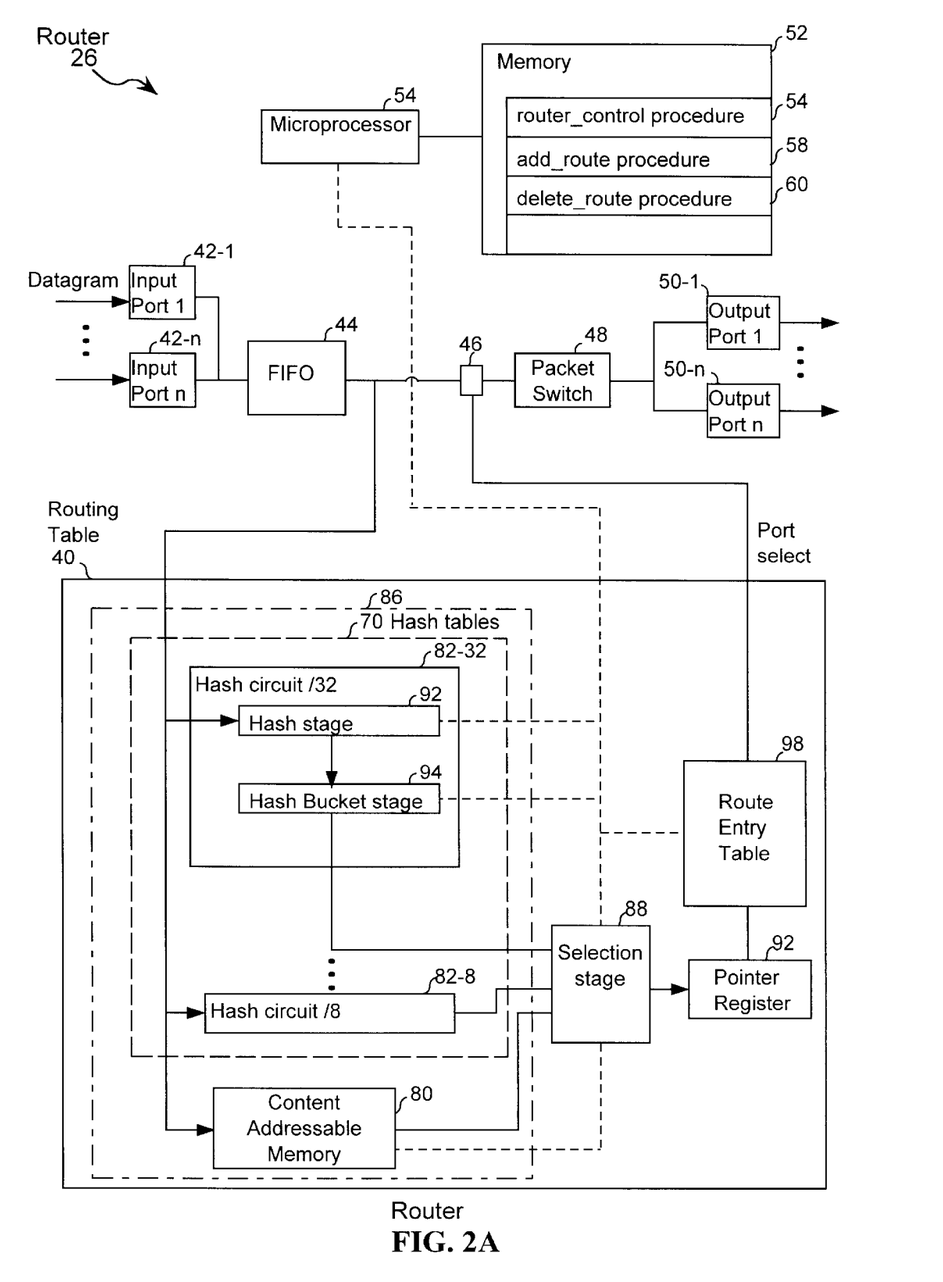
FIG. 2A is a block diagram of a router and routing table according to one embodiment of the present invention.

In FIG. 2A, the router 26 uses the routing table 40 of the present invention to search for a route corresponding to a destination address in a fixed, deterministic, amount of time. The router 26 includes:

input ports 42 that receive datagrams;

a first-in-first-out (FIFO) buffer 44 that stores the datagrams as the datagrams are received by the input ports 42 and that outputs the datagrams for routing in FIFO order;

prepend address logic 46 that prepends a next hop identifier to a datagram;

a packet switch 48 that routes a datagram received from the prepend address logic 46 to one of the output ports 50 in accordance with the next hop identifier;

output ports 50 over which to transmit datagrams;

a memory 52, such as semiconductor memory including RAM and ROM, that stores router procedures;

a microprocessor 54 that executes the router procedures stored in the memory 52; and the routing table 40 of the present invention which will be described in further detail below.

The memory 52 stores the following procedures:

a router_control procedure 54 that controls the overall operation of the router 26;

an add_route procedure 58, called by the router_control procedure 54, that adds a new address to the routing table 40; and a delete_route procedure 60, called by the router_control procedure 54, that deletes an existing address from the routing table 40.

The routing table 40 uses a combination of hash-based routing tables 70, a content addressable memory (CAM) based routing table 80, and pipeline architecture to consistently search for a match to a destination address in a predetermined, finite, deterministic amount of time. In a search, the routing table 40 simultaneously searches the hash-based routing tables 70 and the CAM-based routing table 80 for the destination address, then outputs an output pointer associated with the longest match to the destination address.

In the routing table 40, based on a received destination address, a match determination stage 86 determines whether at least a portion of the destination address matches a stored address and supplies a set of output pointers with associated match lengths to a selection stage 88. The selection stage 88 selects the output pointer associated with the longest match length. The selected output pointer is used, either directly or indirectly, to select the output port over which to transmit the datagram.

In the match determination stage 86, the inputs of the hash circuits 82 of the hash table 70 are connected in parallel with inputs of the CAM 80. The hash circuits 82 and the CAM 80 receive the destination address of a datagram to be routed from the FIFO 46. Each hash circuit 82 has two pipeline stages—a hash stage 92 and a hash bucket stage 94. Each hash circuit 82 is associated with one unique prefix length. As will be discussed below, each hash circuit 82 determines a match based on a predetermined portion of the address using its associated prefix length. For example, the designation "hash circuit/32" indicates that the hash circuit 82-32 uses all thirty-two bits of the destination address in determining whether the destination address matches a stored destination address. The designation "hash circuit/8" indicates that the hash circuit 82-8 uses the eight leading bits of the destination address in determining whether the destination address matches a stored destination address.

The output pointer from the selection stage 88 indirectly selects one of the output ports 48 from a route entry table 98. The route entry table 98 is stored in a semiconductor memory and associates the output pointers with route entry table entries including the next hop identifier. The route entry table 98 is used to conserve logic because the route entry table stores a complete set of information needed to route a datagram and thereby allows the hash circuits 82 and, in an alternate embodiment, the CAM 80, to store pointers instead of the complete set of information. The output pointer from the selection stage 88 is stored in the pointer register 92 and is used as an address to access the entry in the route entry table 98 that stores the desired next hop information.

In an alternate embodiment, the output pointer from the selection stage 88 provides the desired next hop information to control the routing to the output ports 50, and no route entry table 98 is used.

Figure 2B:
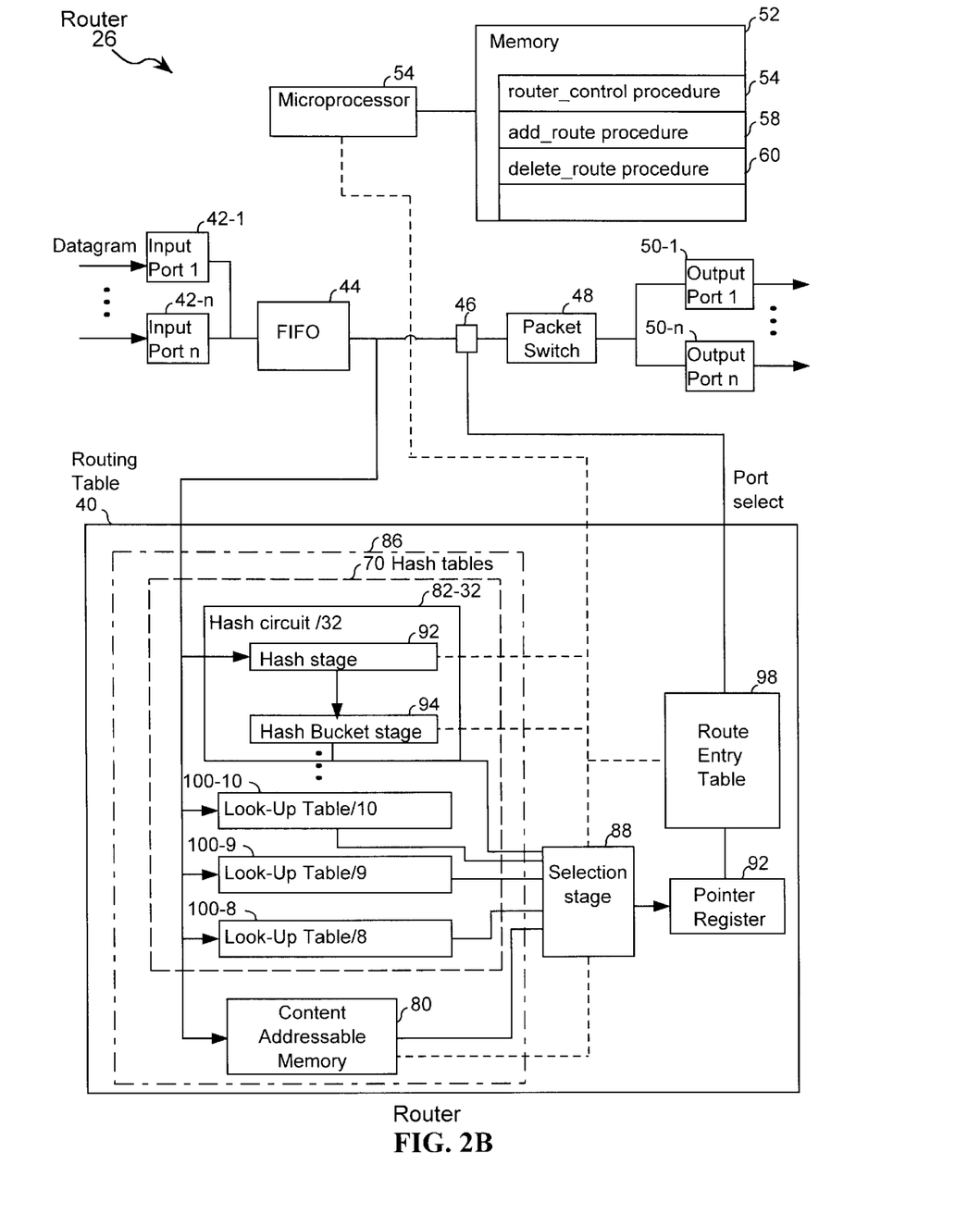
FIG. 2B is a block diagram of a router and routing table according to an alternate embodiment of the present invention.

Referring to FIG. 2B, in an alternate embodiment, one or more look-up tables 100 are connected in parallel with the hash circuits 82. Each look-up table is associated with a distinct prefix length, and provides an output pointer in response to the portion of the message destination address associated with the distinct prefix length. In one embodiment, a look-up table 100-8, 100-9 and. 100-10 is used to analyze the leading eight, nine and ten bits, respectively, of the destination address, rather than using a hash circuit 82. In an alternate embodiment, a look-up table 100-8 is used to analyze the leading eight bits of the destination address. In another alternate embodiment, look-up tables 100-8 and 100-9 are used to analyze the leading eight and nine bits, respectively, of the destination address.

Figure 3:
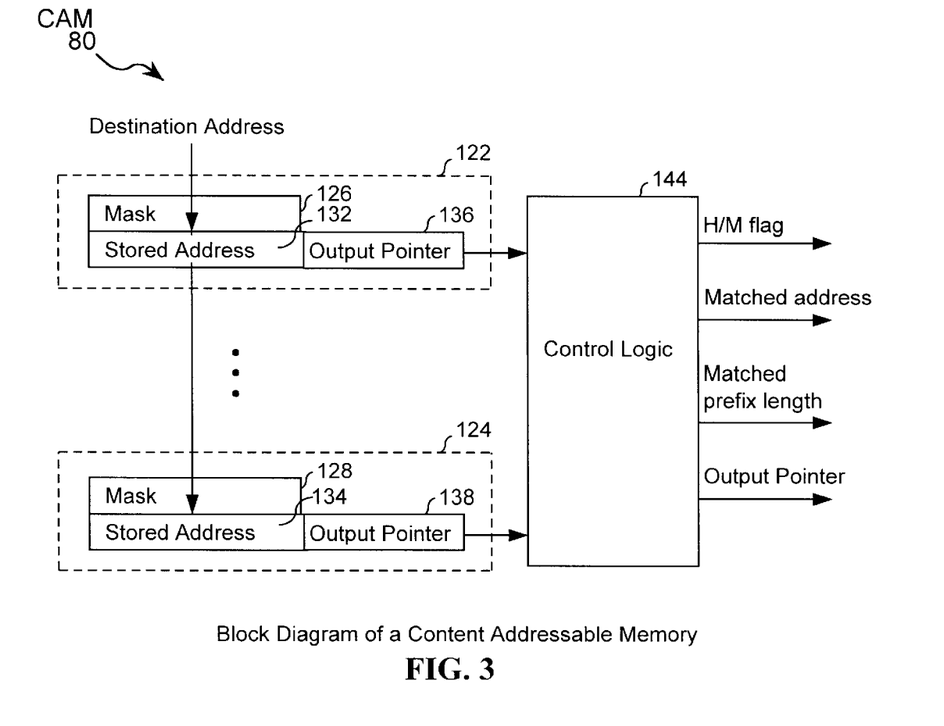
FIG. 3 is a block diagram of a content addressable memory of the routing table of FIG. 2.

In FIG. 3, each entry 122, 124 of the CAM 80 has a mask circuit 126, 128 that masks a predetermined portion of the input data to be compared with the stored comparison data 132, 134, respectively. The stored comparison data includes address values such as IP host and IP network addresses. The mask circuit 126, 128 stores the prefix length of the associated IP host or IP network address stored in the entry 122, 124. The prefix length value in the mask 126, 128 represents the length of the unmasked portion of the IP host or IP network address.

A destination address from a received datagram is input to the CAM 80 as a comparison address. The CAM 80 outputs an output pointer associated with the location of the entry of a matching address value when a portion of the comparison address matches a corresponding portion of the address value specified by the prefix length. The CAM 80 performs a longest prefix match search on the comparison address. The CAM 80 outputs a hit/miss flag, the matched address, the prefix length and the output pointer associated with the entry that provided the longest prefix match.

In an alternate embodiment, the entries 122, 124 also store an associated predetermined output pointer value 136, 138, respectively, with each address value.

One implementation uses a CIDR Processor™ NL77542, 32Kx40, manufactured by the NetLogic Microsystems, Inc. as the CAM 80. Another implementation may use a CAM such as disclosed in U.S. patent application Ser. No. 08/890, 350.

In an alternate embodiment, the CAM 80 is a ternary CAM in which the comparison address and associated information, including the prefix length, is stored in sorted order based on the prefix length.

Because the hash tables 70 (FIG. 2) match masked portions of the destination address, the hash tables will often have collisions when the tables are updated. The CAM based routing table 80 is used to avoid hash collisions in the hash-based routing tables 70 by storing the destination address, prefix length and, in an alternate embodiment, the output pointer, when a hash table already has an entry with the same hash value as the destination address: During searching, the hash tables do not have collisions and multiple matches or hits in the hash tables and CAM are resolved in a subsequent stage.

Figure 4:
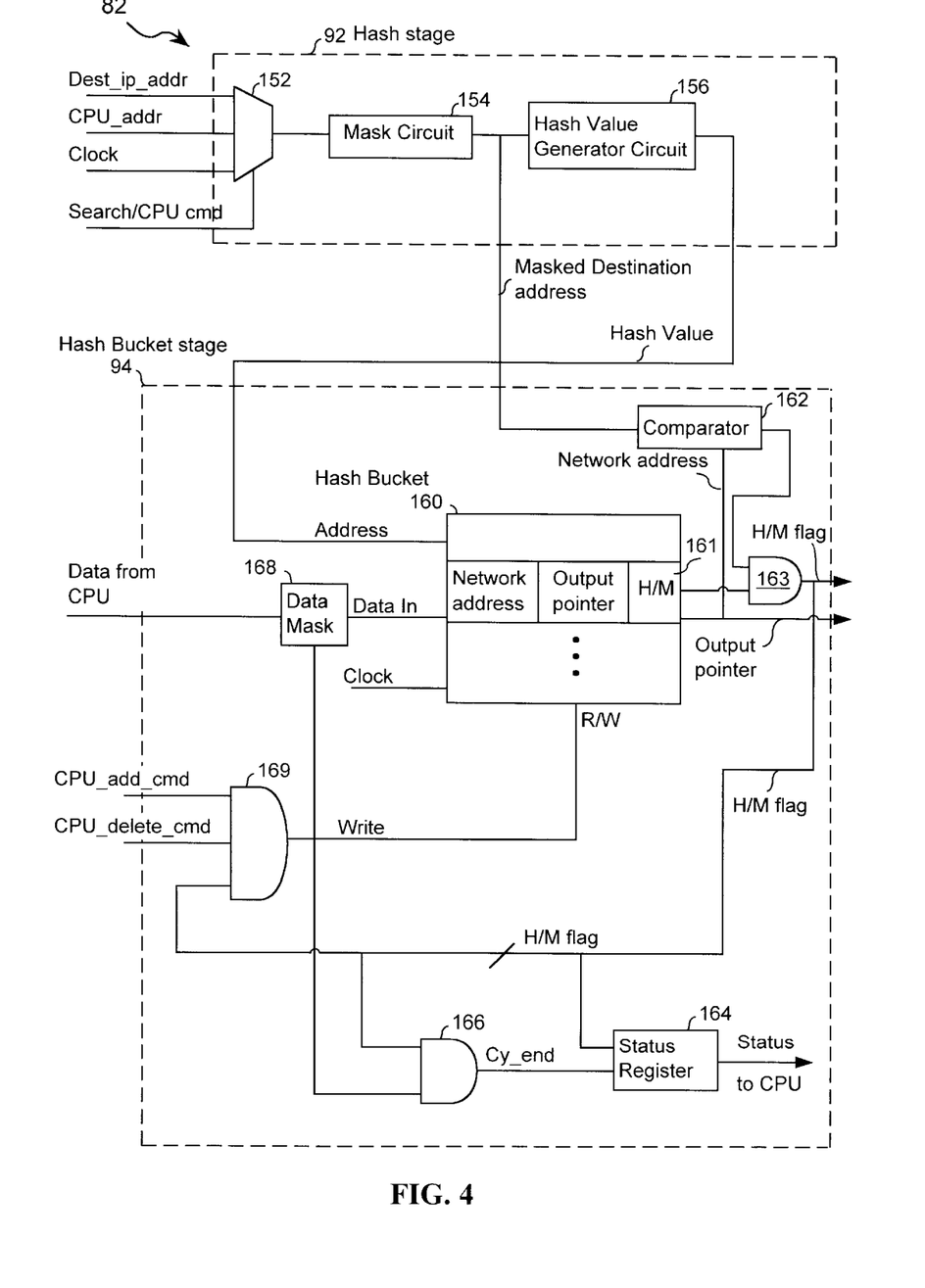
FIG. 4 is a block diagram of a hash stage and a hash bucket stage of the routing table of FIG. 2.

In FIG. 4, an exemplary hash circuit 82 is shown. The components of the hash circuit 82 will first be described with respect to a search or route look-up. During a first pipeline clock cycle, in the hash stage 92, a multiplexor 152, controlled by a search/CPU command signal, selects either the destination address (Dest_ip_addr) from the FIFO or a CPU provided address (CPU_addr) from the microprocessor. When the search/CPU command signal indicates a search, the multiplexor 152 outputs the destination address as a selected address. When the search/CPU command signal indicates CPU, the multiplexor 152 outputs the CPU provided address as the selected address.

A mask circuit 154 receives the selected address from the multiplexor 152 and outputs a masked address. Each mask circuit 154 outputs the high order bits of the network portion of the destination address that correspond to the prefix length for that hash circuit 82. For example, the mask circuit for hash circuit 82-8 (FIG. 2) will output the leading eight bits of the network portion of the destination address, while the mask circuit for hash circuit 82-32 (FIG. 2) will output all thirty-two bits of the network portion of the destination address.

A hash value generator circuit 156 receives the masked address and uses the masked address as a hash key. The hash value generator circuit 156 generates a hash value or index using the masked address.

In the hash bucket stage 94, a hash bucket 160 stores network addresses and output pointers at addresses corresponding to the hash value of their associated masked destination addresses. During a second pipeline clock cycle, a hash hit/miss circuit (H/M) 161 outputs a first hit/miss signal that indicates a hit when a valid output pointer is stored at the address associated with the hash value. In one embodiment, an invalid output pointer is a null value, while a valid output pointer is a non-null value. When a hit occurs, the hash bucket 160 sets and outputs the first hash bucket hit/miss signal, and also outputs the output pointer.

Because multiple network addresses may be associated with one hash value, a comparator 162 compares the masked destination address to the network address stored in the entry that generated the hit. If the masked destination address matches the network address, the comparator 162 outputs a second hit/miss signal that indicates that the addresses match; otherwise the comparator 162 outputs a second hit/miss signal that indicates that the addresses do not match. An AND gate 163 outputs a hit/miss flag from the hash circuit 82 based on the first hit/miss signal and the second hit/miss signal. The hit/miss flag indicates a hit when first hit/miss signal indicates a hit and the second hit/miss signal indicates that the addresses match; otherwise the hit/miss flag indicates a miss.

A status register 164 is read by the microprocessor when updating the routing table 40 during add and delete operations, and not during search operations. The status register includes a hit/miss (H/M) flag indicating whether any of the hash circuits generated a hit, an acknowledge flag indicating that an add or delete operation is in progress, and a cycle end flag (cycle_end) indicating that the add or delete cycle is complete.

As will be described below, a data mask circuit 168 and another AND gate 169 are used when updating the hash buckets.

Figure 5:
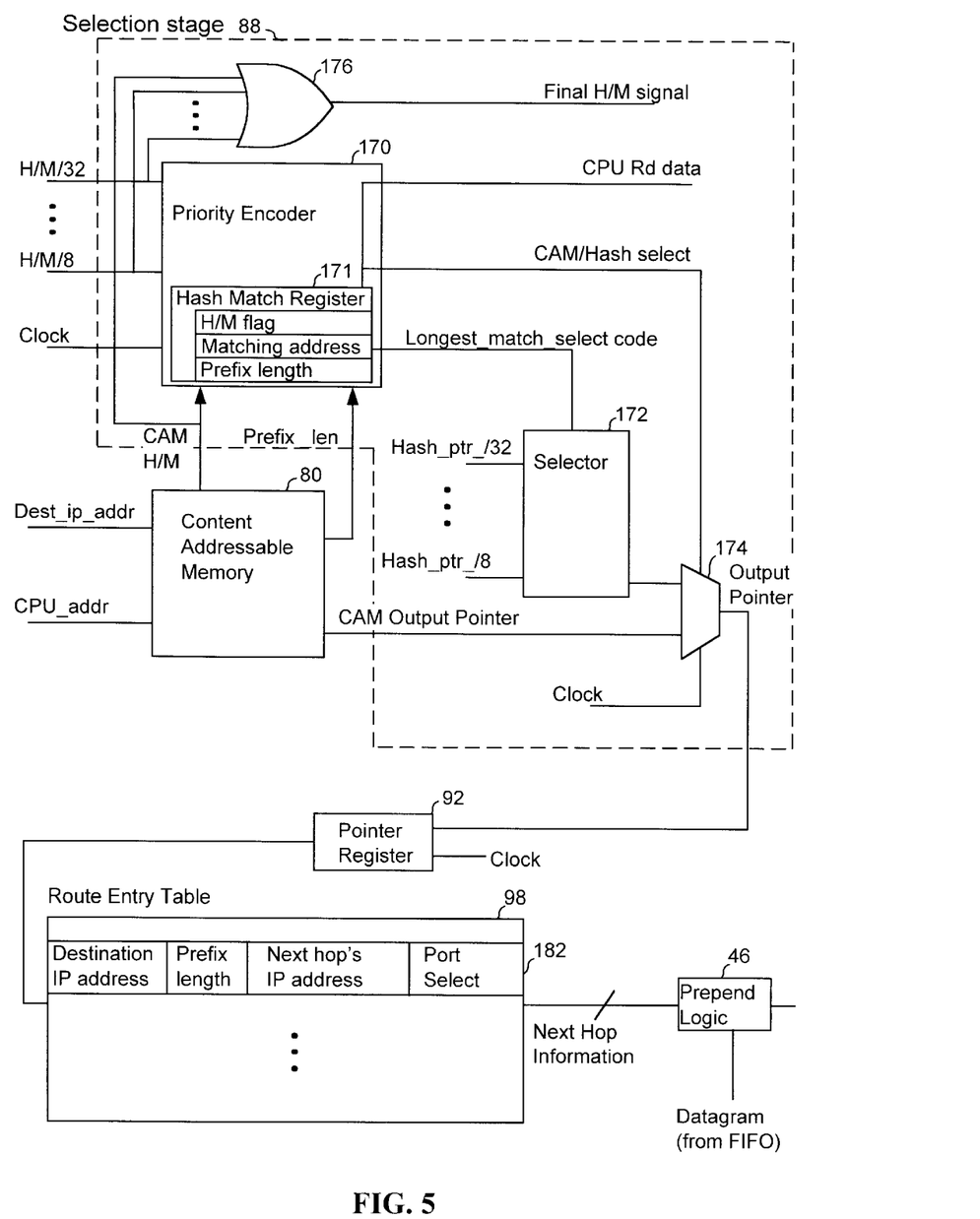
FIG. 5 is a block diagram of a selection stage of the routing table of FIG. 2.

In FIG. 5, the CAM 80 and the selection stage 88 are shown in more detail. During the first and second pipeline clock cycles, the CAM 80 receives the entire destination address and determines whether the destination address matches a portion of at least one of the addresses already stored in the CAM 80. The CAM 80 outputs a CAM hit/miss flag indicating whether a match occurred. When the CAM 80 has a hit, the CAM 80 determines the length of the destination address of the match. If a match occurred, the CAM 80 also outputs the CAM output pointer and the prefix length of the match. The portion of the matching address and the prefix length of the match are determined from the most to least significant bits of the destination address. When the CAM 80 has multiple hits, the CAM outputs the destination address having the longest prefix length.

During a third pipeline clock cycle, in the selection stage 88, a priority encoder 170 identifies the output pointer associated with the longest match among the hash circuits 82 (FIG. 2) and CAM 80. The priority encoder 170 receives the hash circuit hit/miss flags (H/M/32 . . . H/M/8) from the hash circuits 82 (FIG. 2) and the CAM hit/miss (H/M) flag from the CAM 80. The priority encoder 170 also receives the prefix length of the match from the CAM 80. The hit/miss flags from each hash bucket circuit are input to predetermined lines of the priority encoder 170 such that each line corresponds to the unmasked prefix length of that hash bucket circuit. In the priority encoder 170, a hash match register 171 includes a hash hit/miss flag, a matching hash address, and the matched hash prefix length. When the CAM 80 has the prefix length indicating the longest match, the priority encoder 170 outputs a CAM/hash select signal indicating the CAM. When one of the hash circuits has the longest match, the priority encoder 170 outputs a CAM/hash select signal indicating the hash circuits and also outputs a longest match select code signal corresponding to the hash circuit having the longest match.

A selector 172 receives the hash circuit output pointers (Hash_ptr_/32 . . . Hash_ptr_/8), if any, from the hash buckets and outputs the hash circuit output pointer from the hash circuit associated with the longest match select code signal as the selected hash output pointer. A multiplexor 174 receives the selected hash output pointer and the CAM output pointer and outputs either the hash or CAM output pointer as the selected output pointer based on the CAM/hash select signal.

Also during the third pipeline clock cycle, an OR Gate 176 generates a final hit/miss (H/M) signal by performing an OR of the CAM hit/miss flag with all the hash circuit hit/miss flags. If the final H/M signal indicates no hits, the microprocessor outputs a predetermined, user-defined, default value as the output pointer to select a default route.

The pointer register 92 receives and stores the selected output pointer from the multiplexor 174 on each clock cycle. The output pointer in the pointer register 92 is used to address the route entry table 98 to select an entry 182 as described above. The route entry table 98 stores entries including the destination IP address, the prefix length, the next hop's IP address and a port select value. The next hop identifier includes the next hop's IP address and the port select value.

Figure 6:
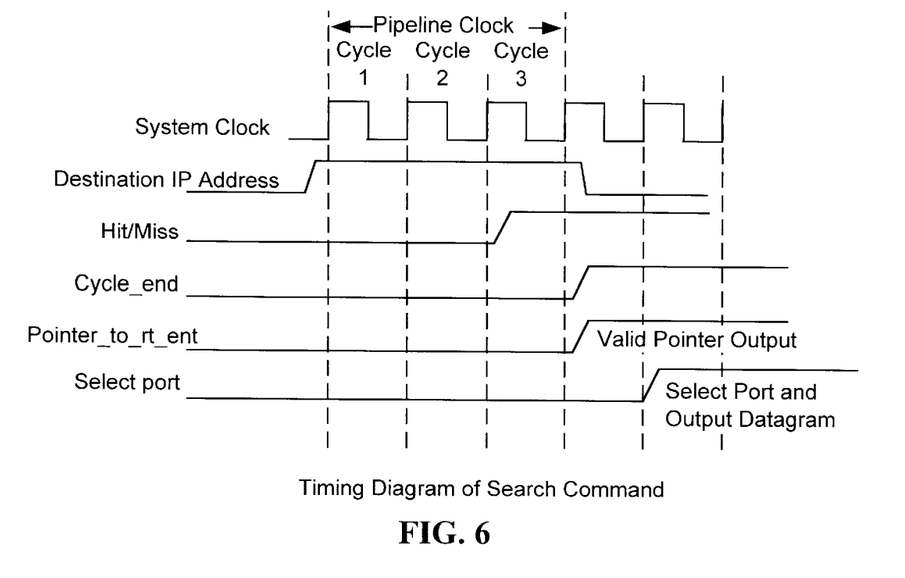
FIG. 6 is a timing diagram of a search of the routing table of the router of FIG. 4.

In FIG. 6, a timing diagram of the search operation is shown. A system clock generates pulses, and the pipeline cycles are labeled as pipeline clock cycle 1, pipeline clock cycle 2 and pipeline clock cycle 3. At the start of pipeline clock cycle 1, the destination address is supplied to the hash-based table and CAM. The hash-based table uses the first and second clock cycles to generate the hash hit/miss flags. The CAM will also have generated the CAM hit/miss flag at the start of the third clock cycle. During the third pipeline clock cycle, the selection stage selects the output pointer and generates the final H/M signal as described above. At the end of the third pipeline clock cycle, a Cycle_end signal is asserted and the selected output pointer is output. Because this embodiment uses a route entry table to determine which output port to use, another cycle is used to access the route entry table, prepend the next hop identifier, select the output port and output the datagram.

Figure 7:
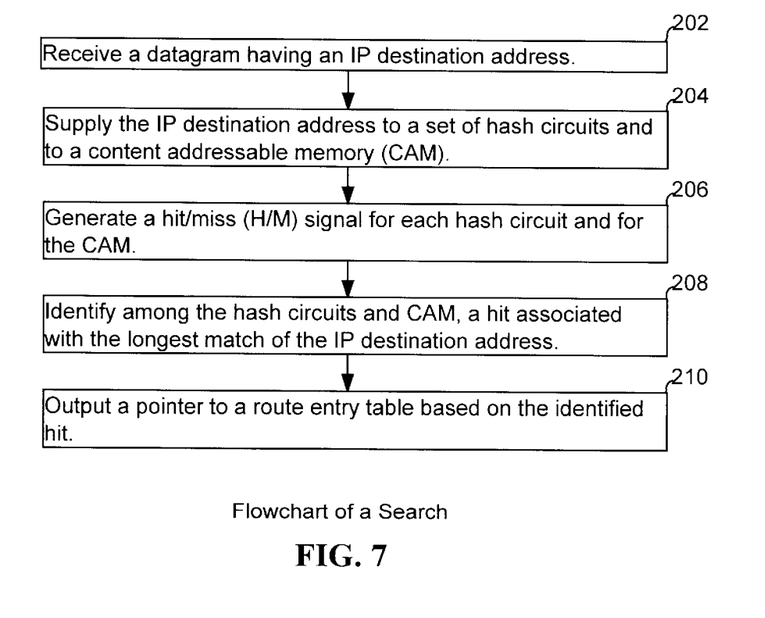
FIG. 7 is a flowchart of a search command using the routing table of FIG. 2.

In FIG. 7, a flowchart of a method of searching the routing table is shown. In step 202 a datagram having an IP destination address is received. In step 204, the IP destination address is supplied to a set of hash circuits and to a CAM. In step 206, a hit/miss signal is generated for each hash circuit and the CAM. In step 208, the CAM or the hash circuit having a hit associated with the longest match of the IP destination address is identified. In step 210, an output pointer associated with the longest match is output.

Updating the Routing Table

During operation, the routing table 40 (FIG. 2) is updated. New route entries are added to the hash buckets and to the CAM and existing route entries are deleted from the hash buckets and CAM.

Referring back to both FIGS. 4 and 5, the addition of a new route entry to the hash bucket 160 of the routing table 40 will be described. For an add operation, on pipeline clock cycle 1, a destination address is supplied by the microprocessor as the CPU_addr and is input to the mask circuit 154 in response to the Search/CPU command line. The hash function generator circuit 156 generates a hash value based on the supplied address. The microprocessor also outputs data corresponding to the output pointer associated with the destination address to the data mask circuit 168. The data mask circuit 168 acts as a driver when writing data to the hash bucket to allow the data from the CPU to be stored into the hash bucket. If the entry to the hash bucket at the generated hash value is empty, the supplied output pointer is stored in that address on the second pipeline clock cycle. The AND gate 169 generates the write signal to the data mask circuit 168 and the hash bucket 160 when the hit/miss signal from the hash bucket indicates a miss, and the CPU_add_cmd and the CPU_delete_command signals are high.

When the entry to the hash bucket already stores another route entry, as when the hit/miss signal indicates a hit, the destination address, prefix length and the output pointer is stored in the CAM 80. When the CAM 80 already has an entry for a destination address, the prefix length and output pointer are updated for that destination address. When storing data to the CAM 80, the data to be stored (CPU-addr) is supplied on a set of input lines different from the data to be compared (dest_ip_addr).

When an entry is to be deleted, the destination address of the route entry is searched in the routing tables. The hash match register 171 of the priority encoder 170 is checked. The output pointer is removed from a hash bucket if the information in the hash match register 171 matches the information in the route entry to be removed. At the same time, the CAM match register 146 is checked. When the CAM hit/miss flag indicates a hit and unless the information in the hash match register 171 matches the information in the route entry to be removed, the route entry is removed from the CAM when the information in the CAM match register 146 matches the destination address for the associated prefix length.

When an entry is deleted from a hash table, a CAM entry may be moved to that deleted entry in the hash table to enhance CAM utilization. If the CAM stores a destination address that can be stored in that hash table then that destination address is deleted from the CAM and stored in the hash table. In other words, an entry is moved from the CAM to the hash table if the hash value of the destination address of the entry in the CAM is equal to the index of the hash table in which the deleted address was stored.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A routing table circuit for a router having one or more input ports for receiving a message having a message destination address, the router having a plurality of output ports for transmitting the message, the routing table circuit comprising:
    a content addressable memory (CAM) storing a plurality of data pairs, each data pair including an address value and a prefix length, the CAM outputting an output pointer associated with the address value when a portion of the message destination address matches a corresponding portion of the address value specified by the prefix length stored in the data pairs;
    a plurality of hash circuits, connected in parallel with the CAM, each hash circuit being connected in parallel with other hash circuits, each hash circuit hashing a portion of the message destination address to provide a hashed-message-destination address, each hash circuit having a hash bucket storing output pointers at associated hash bucket addresses in the hash bucket, each hash circuit outputting the stored output pointer, if any, associated with the hashed-message-destination address; and
    a selection circuit, connected in series with the CAM and the plurality of hash circuits, that selects one of the output pointers output by the plurality of hash circuits and the CAM to provide a selected output pointer;
    wherein the CAM and the plurality of hash circuits are configured to all perform address lookup operations simultaneously, and wherein each hash circuit of the plurality of hash circuits has associated therewith a distinct respective prefix length, and is configured to perform an address lookup on a message destination address prefix having a length equal to said distinct respective prefix length.

2. The routing table circuit of claim 1 wherein each of the hash circuits is further configured to store at most one output pointer at each distinct hash bucket address in the hash bucket.

3. The routing table circuit of claim 1 wherein the data pairs are stored in sorted order in the CAM based on the prefix length.

4. The routing table circuit of claim 1 further comprising:
    one or more look-up tables, connected in parallel with the plurality of hash circuits, each look-up table being associated with a distinct prefix length, each look-up table providing an output pointer in response to the portion of the message destination address associated with the distinct prefix length,
    wherein the selection circuit is connected in series with the one or more look-up tables, and selects one of the output pointers output by the plurality of hash circuits, the CAM and the one or more look-up tables.

5. The routing table circuit of claim 1 wherein the output pointer from the CAM is associated with a storage location of the destination address in the CAM.

6. The routing table circuit of claim 1 wherein the output pointer from the CAM is associated with a storage location having a longest matching prefix length.

7. The routing table circuit of claim 1 wherein the CAM stores an output pointer associated with each destination address.

8. The routing table circuit of claim 1 wherein the hash bucket stores a predefined null output pointer for hash bucket addresses for which there is no associated output pointer.

9. The routing table circuit of claim 1 wherein the CAM outputs a prefix length associated with the output pointer, each hash circuit is also associated with a prefix length, and the selection circuit selects the output pointer associated with the largest prefix length.

10. The routing table circuit of claim 1 further comprising:
    a route entry table that maps the selected output pointer into a next hop identifier for selecting one of the plurality of output ports for outputting the message.

11. The routing table circuit of claim 1 wherein each hash circuit includes:
    a mask circuit, each mask circuit masking a unique number of bits of the destination address to provide a masked address; and
    a hash generator that generates the hashed-message-destination address based on the masked address.

12. A routing table circuit for a router having one or more input ports for receiving a message having a message destination address, the router having a plurality of output ports for transmitting the message, the routing table circuit comprising:
- a content addressable memory (CAM) storing a plurality of data pairs, each data pair including an address value and a prefix length, the CAM outputting an output pointer associated with the address value when a portion of the message destination address matches a corresponding portion of the address value specified by the prefix length stored in the data pairs;
- a plurality of hash circuits, connected in parallel with the CAM, each hash circuit being connected in parallel with other hash circuits, each hash circuit hashing a portion of the message destination address to provide a hashed-message-destination address, each hash circuit having a hash bucket storing output pointers at associated hash bucket addresses in the hash bucket, each hash circuit outputting the stored output pointer, if any, associated with the hashed-message-destination address; and
- a selection circuit, connected in series with the CAM and the plurality of hash circuits, that selects one of the output pointers output by the plurality of hash circuits and the CAM to provide a selected output pointer;
- wherein each hash circuit includes:
  - a mask circuit, each mask circuit masking a unique number of bits of the destination address to provide a masked address; and
  - a hash generator that generates the hashed-message-destination address based on the masked address; and
- wherein the mask circuit and hash generator form a first pipeline stage, the hash bucket circuit forms a second pipeline stage and the selection circuit forms a third pipeline stage.

13. The routing table circuit of claim 12 wherein each pipeline stage is associated with a clock cycle, and the selected output pointer is output in a predetermined number of clock cycles.

14. The routing table circuit of claim 13 wherein the predetermined number of clock cycles is equal to three.

15. The routing table circuit of claim 1 wherein the selection circuit includes:
- a priority encoder that selects one of the output pointers from the plurality of hash circuits based on the prefix length associated with the hash circuits as a selected hash output pointer; and
- a multiplexor that selects the output pointer from the CAM or the selected hash output pointer as the selected output pointer.

16. A router comprising:
- a plurality of input ports that receive a message having a destination address;
- a plurality of output ports that output the message in accordance with an output pointer;
- a content addressable memory (CAM) storing a plurality of data pairs, each data pair including an address value and a prefix length, the CAM outputting an output pointer associated with the address value when the message destination address matches the address value specified by the prefix length stored in the data pairs;
- a plurality of hash circuits, connected in parallel with the CAM, each hash circuit being connected in parallel with other hash circuits, each hash circuit hashing a portion of the message destination address to provide a hashed-message-destination address, each hash circuit having a hash bucket storing output pointers at associated hash bucket addresses in the hash bucket, each hash circuit outputting the stored output pointer, if any, associated with the hashed-message-destination address; and
- a selection circuit, connected in series with the CAM and the plurality of hash circuits, that selects one of the output pointers output by the plurality of hash circuits and the CAM to provide a selected output pointer;
- wherein the CAM and the plurality of hash circuits are configured to perform address lookup operations simultaneously, and wherein each hash circuit of the plurality of hash circuits has associated therewith a distinct respective prefix length, and is configured to perform an address lookup on a message destination address prefix having a length equal to said distinct respective prefix length.

17. The router of claim 16 wherein each of the hash circuits is further configured to store at most one output pointer at each distinct hash bucket address in the hash bucket.

18. The router of claim 16 wherein the CAM outputs a prefix length associated with the output pointer, each hash circuit is also associated with a prefix length, and the selection circuit selects the output pointer associated with the largest prefix length.

19. The router of claim 16 further comprising:
- a route entry table that maps the selected output pointer to a next hop identifier for selecting one of the plurality of output ports for outputting the message.

20. The router of claim 16 wherein each hash circuit includes:
- a mask circuit, each mask circuit masking a unique number of bits of the destination address to provide a masked address; and
- a hash generator that outputs a hash address based on the masked address, wherein the hash address is applied as the hash bucket address.

21. A router comprising:
- a plurality of input ports that receive a message having a destination address;
- a plurality of output ports that output the message in accordance with an output pointer;
- a content addressable memory (CAM) storing a plurality of data pairs, each data pair including an address value and a prefix length, the CAM outputting an output pointer associated with the address value when the message destination address matches the address value specified by the prefix length stored in the data pairs;
- a plurality of hash circuits, connected in parallel with the CAM, each hash circuit being connected in parallel with other hash circuits, each hash circuit hashing a portion of the message destination address to provide a hashed-message-destination address, each hash circuit having a hash bucket storing output pointers at associated hash bucket addresses in the hash bucket, each hash circuit outputting the stored output pointer, if any, associated with the hashed-message-destination address; and
- a selection circuit, connected in series with the CAM and the plurality of hash circuits, that selects one of the output pointers output by the plurality of hash circuits and the CAM to provide a selected output pointer;

wherein each hash circuit includes:
- a mask circuit, each mask circuit masking a unique number of bits of the destination address to provide a masked address; and
- hash generator that outputs a hash address based on the masked address, wherein the hash address is applied as the hash bucket address; and wherein the mask circuit and hash generator form a first pipeline stage, the hash bucket circuit forms a second pipeline stage and the selection circuit forms a third pipeline stage.

22. The router of claim 21 wherein each pipeline stage is associated with a clock cycle, and the selected output pointer is output in a predetermined number of clock cycles.

23. The router of claim 22 wherein the predetermined number of clock cycles is equal to three.

24. The router of claim 16 wherein the selection circuit includes:
- a priority encoder that selects one of the output pointers from the plurality of hash circuits based on the prefix length associated with each hash circuit as a selected hash output pointer; and
- a multiplexor that selects the output pointer from the CAM or the selected hash output pointer as the selected output pointer.

25. A method of determining an output port for a datagram use in a router, comprising:
- receiving a datagram having a datagram destination address;
- storing, in a content addressable memory (CAM), a plurality of data pairs, each data pair including an address value and a prefix length;
- storing output pointers at associated hash bucket addresses in a hash bucket;
- storing a predefined null port pointer for hash bucket addresses in the hash bucket for which there is no associated port pointer;
- hashing a portion of the message destination address to provide a hashed-message-destination address;
- outputting from the hash bucket, the stored output pointer, if any, associated with the hashed-message-destination address;
- outputting from the CAM, the output pointer associated with the address value in one of the stored data pairs when the message destination address matches at least a portion of the address value based on the associated prefix length; and
- selecting one of the output pointers output by the plurality of hash circuits and the CAM;

wherein said step of hashing is performed in a first pipeline clock cycle, said step of outputting from the hash bucket is performed in a second pipeline clock cycle, said step of outputting from the CAM is performed in the first and the second pipeline clock cycles, and said step of selecting is performed in a third pipeline clock cycle.

26. A method of routing a message having a message destination address, comprising:
- performing a lookup operation in a content addressable memory (CAM) storing a plurality of data pairs, each data pair including an address value and a prefix length, the CAM outputting an output pointer associated with the address value when a portion of the message destination address matches a corresponding portion of the address value specified by the prefix length stored in the data pairs;
- performing simultaneous address lookup operations in a plurality of hash circuits, including, in each hash circuit, hashing a portion of the message destination address to provide a hashed-message-destination address, and outputting a stored output pointer, if any, associated with the hashed-message-destination address; and
- selecting one of the output pointers output by the plurality of hash circuits and the CAM to provide a selected output pointer.

27. The method of claim 26, wherein each hash circuit of the plurality of hash circuits has associated therewith a distinct respective prefix length, and is configured to perform an address lookup on a message destination address prefix having a length equal to said distinct respective prefix length.

* * * * *